United States Patent

[11] 3,593,362

[72] Inventor Dario Arman
 Strada Comunale Druento-Venaria, Druento, Torino, Italy
[21] Appl. No. 781,544
[22] Filed Dec. 5, 1968
[45] Patented July 20, 1971
[32] Priority July 30, 1968
[33] Italy
[31] 526 38-A/68

[54] CONNECTING MEANS FOR WINDSHIELD WIPER BLADE
 1 Claim, 7 Drawing Figs.
[52] U.S. Cl. ..................................................... 15/250.32
[51] Int. Cl. ..................................................... B60s 1/04, A47l 1/02
[50] Field of Search ........................................... 15/250.32, 250.33

[56] References Cited
UNITED STATES PATENTS
2,915,770 12/1959 Scinta ........................... 15/250.32
3,049,743 8/1962 Graczyk et al. ................ 15/250.32

Primary Examiner—Peter Feldman
Attorney—Clario Ceccon

ABSTRACT: A plastic, box-shaped element, attached to an oscillating, U-shaped support, releasably holds an automotive wiper blade by means of a spring that has a first portion captured within the box-shaped element and a second or toothed portion that is in engagement with the wiper blade.

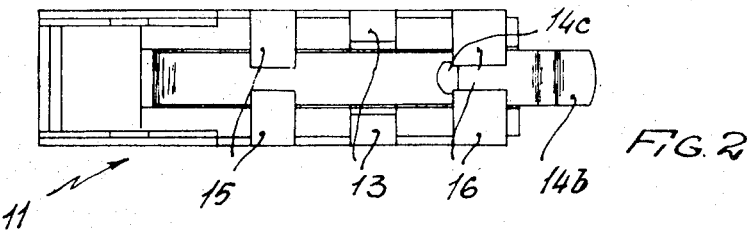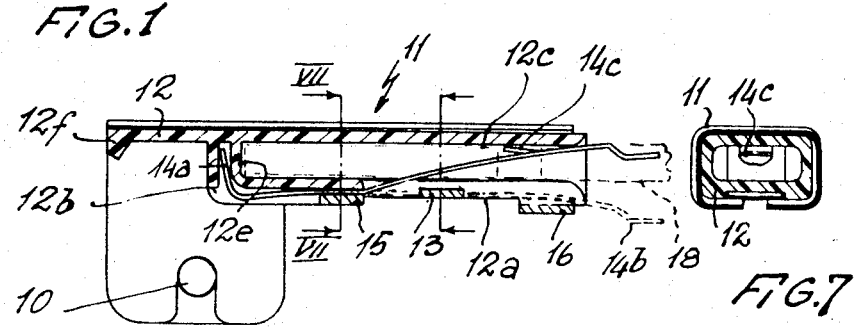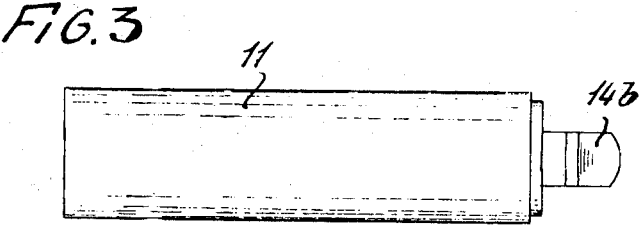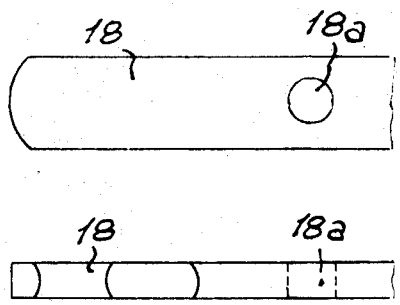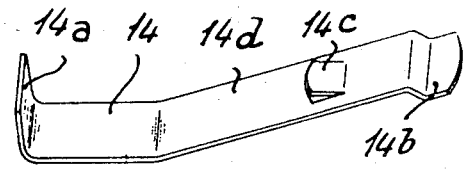

CONNECTING MEANS FOR WINDSHIELD WIPER BLADE

This invention relates generally to windshield wipers and more particularly to an improvement in an attachment that forms the releasable connection between the end of the oscillating arm and the back support of a windshield wiper blade in motor vehicles in general.

As is known, in windshield wiper devices, the wiping blade must be easily detachable from its oscillating arm and yet must not be susceptible of accidental disconnection. To accomplish this, devices are widely employed wherein a spring member, carried by the back support of the blade, presses the oscillating arm end against the support bottom. A stop pin engaging a cooperating seat assures the connection between the two parts, in the longitudinal direction.

In the attaching devices so far employed lamel or thin plate spring member is directly mounted in contact with the metal surfaces of the channel-shaped support and therefore, during operation of the windshield wiper device, and as a result of torsional stresses to which the wiping blade is subjected, the attaching device presents transverse clearance that causes troublesome noise.

The main object of the present invention is to provide a connection to the above-mentioned type, wherein the connected parts have such a structure as to avoid any noise during operation.

Another object the present invention is to provide an improved connection having a simple structure that is easily disconnected by depressing a springlike thin plate or lamel acting as the retaining member between the wiper blade back and the channel-shaped support that is articulate with respect to the arm end.

Considering the objects aforesaid, the attaching device according to the present invention is substantially characterized by the fact that it comprises a box-shaped element, made of a molded plastic material fitted within the channel-shaped support and intended to act as the anchorage member for the end of the spring plate or lamel opposed to the manipulatable end. Said element made of molded plastic material is further intended to receive the end of the cooperating wiper blade in order to eliminate any noise due to the connection between said parts.

These and other objects and features of the attaching device according to the invention will appear from the following specification given with reference to the drawing annexed only as demonstrative example and wherein:

FIG. 1 is a longitudinal cross section of the complete connecting device;

FIG. 2 is a bottom view of the channel-shaped element;

FIG. 3 is a top view of same;

FIG. 4 is a perspective view of the spring lamel or thin plate inserted within the channel-shaped element;

FIGS. 5 and 6 are a plan and a side view respectively of the wiper blade which is to be inserted in the box-shaped element; and FIG. 7 is a cross section along line VII-VII of FIG. 1.

With reference to the drawing, on the back of the wiping blade, as known, the channel-shaped support indicated by 11 is articulated at 10. According to the present improvement a box-shaped element 12, made of a molded plastic material, is mounted within support 11 and longitudinally engaged by two tongues 13, integral with support 11 and bent so as to engage the corresponding seats formed on contact edge 12a of element 12. Said element 12 is provided with a recess 12b at 90° with respect to the longitudinal cavity 12c. Within recess 12b is disposed the end 14a of spring 14 (FIG. 4) which formed by a steel laminate element, presenting a manipulatable end 14b intended to project from the open end of channel-shaped support 11, while the opposite end 14a is bent at approximately a 90° angle. Said spring 14 is further provided with a retaining tooth 14c, which due to the inclination of the longer section 14d, resiliently presses against the upper wall of box-shaped element 12 and hence against the bottom wall of the U-shaped support 11. A second pair of tongues 15, bent onto the back of spring 14 when the latter is mounted in its seat, prevent any longitudinal displacement of the spring, locking it with respect to the lower surface of the plastic material element 12, in cooperation with the retaining end 14a accommodated within the recess 12b. The channel-shaped support 11 is provided with a third pair of tongues or projections 16 which are bent adjacent the open end of said support 11 and which are arranged to restrict deformation of section 14d of spring 14, during the manipulation thereof to disconnect the arm end from support 11. Cavity 12c is intended to receive the end 18 of an oscillating arm which is a part of the windshield wiper mechanism.

As shown in FIGS. 5 and 6, said end 18 is provided with a retention seat 18a which is releasably engaged by tooth 14c of spring 14 as represented by dashed lines on FIG. 1. Wall 12e of plastic material element 12 limits the longitudinal insertion of end 18 of the oscillating arm. The end 18 is disposed in cavity 12c of channel-shaped support 11 and is entirely contained and in contact with plastic material element 12, except in the section-engaging tooth 14c of spring 14. The disconnection of end 18 from support 11 is effected by engaging end 14d of spring 14 and deforming it utilizing its resilience until it reaches the position shown by dashed lines in FIG. 1. In these conditions, tooth 14c disengages from seat 18a and therefore support 11, together with the cooperating wiper blade, may be easily separated from the oscillating arm by applying a moderate longitudinal traction. As shown in FIG. 1, projections or tongues 16 acting as elements restricting the deformation movement of spring 14 lie on a plane lower than the planes of tongues 13 and 15. As it may be seen from FIG. 2, projections 16 are longer than projections 13 because, while projections 13 have to engage the box-shaped plastic material element 12 with respect to support 11 but allow the deformation of spring 14, projections 16 must stop that deformation movement.

As represented in FIG. 1 the box-shaped plastic material element 12 terminates at support 11 bottom with a tooth 12f, which when the support 11 is mounted on the cooperating wiping blade, limits the inclination of said support 11, namely, limits its angular movement capacity around pin 10, by contacting the back of the cooperating wiping blade. By varying the shape and the length of tooth 12f the angle of the connecting device with respect to the wiping blade may be changed.

From what has been stated it is apparent that the connecting device according to the invention improvement besides having a simple structure presents the considerable advantage of eliminating the direct contact between the metal surfaces of the channel-shaped support and the end of cooperating wiping blade, thereby reducing to a negligible value the noise of windshield wiper device when it operates and to prolong the part's life.

It is obvious that the present invention is not limited to the example described and illustrated and that it comprises all the variants that may be made to the same.

What I claim is:

1. Apparatus for releasably coupling the oscillating arm of an automatic windshield wiper mechanism to a wiper blade, said apparatus comprising:
   a. a U-shaped support member having means for coupling the wiper blade thereto,
   b. a plastic tubular box-shaped element nested within said support member, said element having a first, elongated cavity for receiving and substantially enclosing the oscillating arm and a second cavity positioned at one end of said first cavity, the axis of said second cavity being perpendicular to the axis of said first cavity,
   c. an elongated plate spring having a first end defined by a right-angle bend, said spring being loosely mounted in said plastic element, the remainder of said spring being defined by a second end that includes two sections positioned at an obtuse angle with respect to each other, said first spring end being disposed in said second cavity, the opposite second end of said spring extending outwardly from said plastic element, said spring being further defined by a tooth formed integrally with said obtuse section remote from said first end for engaging the oscillating arm, and d. three pairs of opposed, laterally positioned and longitudinally spaced tongues, said first pair of tongues retaining said plastic element in said support member, said second pair of tongues retaining said spring within said plastic element, and said third pair of tongues limiting the movement of said second end of said spring.